(12) United States Patent
Chou

(10) Patent No.: US 6,513,944 B2
(45) Date of Patent: Feb. 4, 2003

(54) BACKLIGHT DEVICE WITH EASILY REPLACED LAMP

(75) Inventor: Hui-Kai Chou, Taipei (TW)

(73) Assignee: Au Optronics Corp., Hsinchu (TW)

( * ) Notice: Subject to any disclaimer, the term of this patent is extended or adjusted under 35 U.S.C. 154(b) by 0 days.

(21) Appl. No.: 09/853,807

(22) Filed: May 11, 2001

(65) Prior Publication Data

US 2002/0030983 A1 Mar. 14, 2002

(30) Foreign Application Priority Data

Sep. 13, 2000 (TW) .................................... 089215822 A

(51) Int. Cl.[7] ................................................ F21V 7/04
(52) U.S. Cl. ........................ 362/31; 362/26; 362/561; 349/58

(58) Field of Search ............................. 362/27, 30, 31, 362/561, 368, 378, 26; 349/58, 61

(56) References Cited

U.S. PATENT DOCUMENTS 5,666,172 A * 9/1997 Ida et al. ...................... 349/58

* cited by examiner

Primary Examiner—Sandra O'Shea
Assistant Examiner—John Anthony Ward
(74) Attorney, Agent, or Firm—Ladas & Parry

(57) ABSTRACT

A backlight device with an easily replaced lamp. The backlight device includes a frame, a lighting guide and at least one lamp assembly. The frame has an inner surface. The lighting guide is disposed inside the frame. The lamp assembly is disposed inside the frame and besides the lighting guide. A gap is provided between the inner surface of the frame and the lamp assembly to decrease the friction applied onto the lamp assembly.

5 Claims, 7 Drawing Sheets

BACKLIGHT DEVICE WITH EASILY REPLACED LAMP

BACKGROUND OF THE INVENTION

1. Field of the Invention

The present invention relates in general to a backlight device, wherein it is easy to replace the tubular lamps of the backlight device.

2. Description of the Related Art

Backlight devices are widely used in liquid crystal displays (LCDs) and scanners. A backlight device has tubular lamps inside to generate light. The lamps need to be replaced when they burn out. U.S. Pat. No. 5,537,296 discloses a structure of a backlight device, the only one part that the backlight device of the burned liquid crystal displays need to replaced is the tubular lamp. Other elements besides the burned lamp are left without being replaced together. However, it is difficult for an operator to disassemble and assemble the backlight device for repairing the burned lamp. JP patent No. 4-104486 and 4-288526 simplify the structure of the backlight device for easy maintenance, wherein the burned lamp is drawn out from the side surface of the backlight device. However, when the friction applied to the lamp is great, it is difficult to draw out a tight tubular lamp.

FIG. 1A is an exploded perspective diagram of a conventional backlight device, wherein the directions of top, bottom, left, right, front and rear are defined for easy description. The backlight device includes a first frame 1, a diffuser 2, a lighting guide 3, a reflection sheet 4, a second frame 5, a back plate 6 and two lamp assemblies 7. In the assembling operation, the back plate 6 and the second frame 5 are screwed together via screws 61, and it looks like a box without a cover. Then, the reflection sheet 4, lighting guide 3 and diffuser 2 are put in the box in sequence, with one laid over another. Grooves 51 are formed between the second frame 5 and the lighting guide 3. The lamp assemblies 7 are inserted, from the right to the left, into the grooves 51. Then, the second frame 5 is engaged with the first frame 1 by the engaging portions 52 to fix all of the elements 4, 3, 2, 7 therebetween.

Referring to FIG. 1B and FIG. 2, each lamp assembly 7 includes two fluorescent tubes 72, a tube guard 71 covering the fluorescent tubes 72, and a base 73 for fixing the fluorescent tubes 72 in the tube guard 71. Light is emitted from the fluorescent tubes 72 to propagate in the lighting guide 3 in two paths: (1) Light 75 passes through the front surface of the lighting guide 3 and then propagates out from the diffuser 2. (2) Light 76 passes through the rear surface of the lighting guide 3, is scattered by protrusions 31 on the lighting guide 3, is reflected by the reflection sheet 4 back to the lighting guide 3, and then propagates out from the diffuser 2. The protrusions 31 on the rear surface of the lighting guide 3 are used for scattering the light 76. The diffuser 2 is provided to further scatter the light 76 so that the distribution of the light 76 out from the diffuser 2 is more uniform (without the diffuser 2, the images of the protrusions 31 can still be observed by the user in front of the lighting guide 3).

It is important that the distance between the fluorescent tubes 72 and the lighting guide 3 must be accurately kept, otherwise (a) the light emitted out from the upper portion and lower portion of the lighting guide 3 will be too strong due to the fluorescent tubes 72 are too close to the lighting guide 3. (b)On the other hand, the light emitted out from the upper portion and lower portion of the lighting guide 3 will be poor due to the fluorescent tubes 72 are far away from the lighting guide 3.

FIG. 3 is a front view of FIG. 1A, wherein the lighting guide 3, the reflection sheet 4, the second frame 5 and the back plate 6 are already assembled. Also, the diffuser 2 and the first frame 1 are not shown in FIG. 3. In assembling operation, the lamp assemblies 7 are inserted into grooves 51 from the right to the left, wherein the grooves 51 is formed and disposed between the second frame 5 and the lighting guide 3. In the disassembling operation, ordinary the lamp assemblies 7 are pulled out from the grooves 51 from the left to the right. The widths of the grooves 51 and those of the lamp assemblies 7 are well matched to keep the lamp assemblies 7 tight, therefore, it is difficult for an operator to assemble/disassemble the backlight device due to a great friction between the lamp assemblies 7 and the grooves 51.

SUMMARY OF THE INVENTION

An object of the present invention is to provide a backlight device with easy maintained tubular lamps.

The backlight device of the present invention includes a frame, alighting guide and at least one lamp assembly. The frame has an inner surface. The lighting guide is disposed inside the frame. The lamp assembly is disposed inside the frame and beside the lighting guide. A gap is provided between the inner surface of the frame and the lamp assembly to decrease the friction between the lamp assembly and the frame, thereby facilitating the replacement of the tubular lamp.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1A:
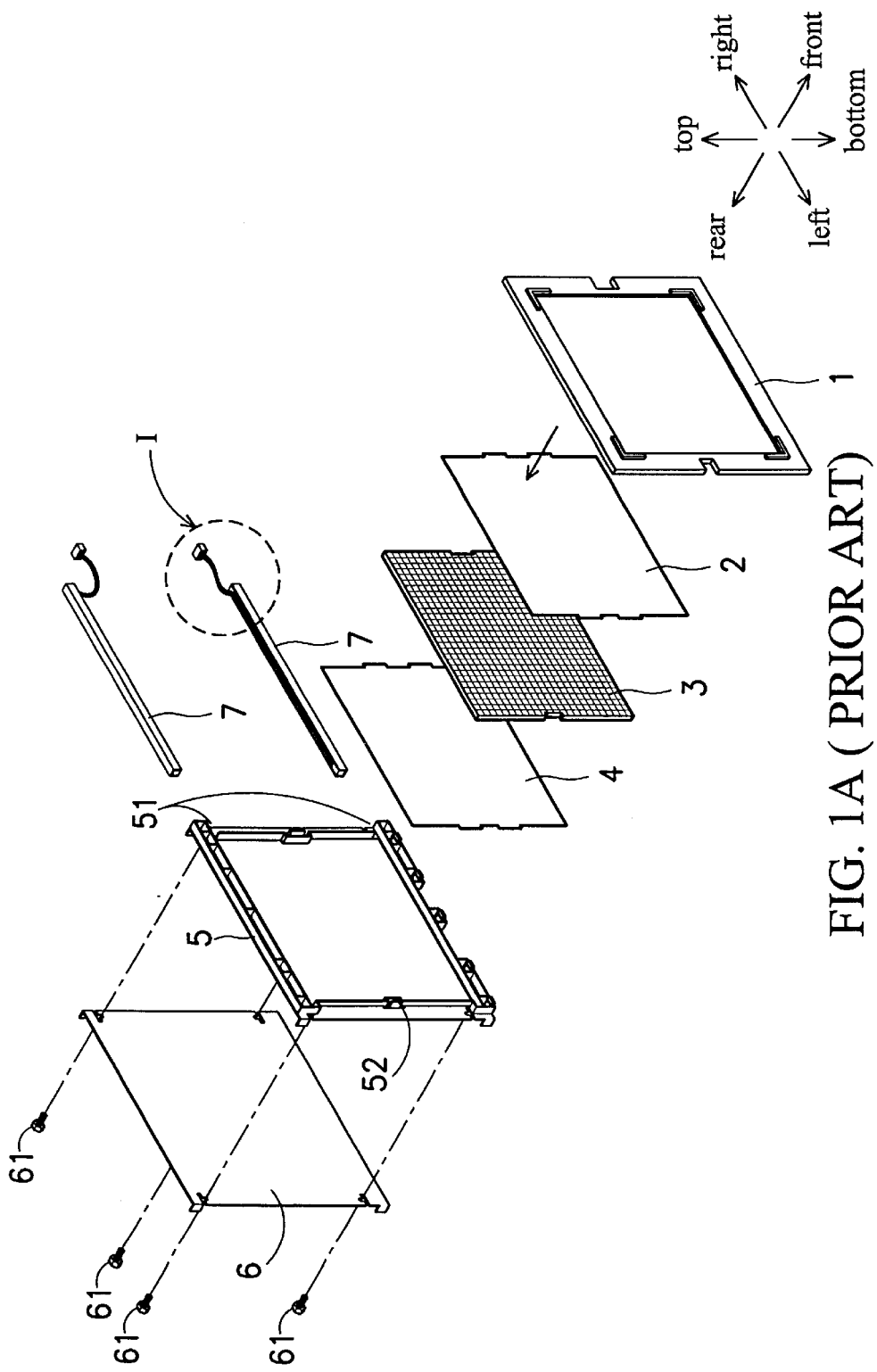
FIG. 1A is an exploded perspective diagram of a conventional backlight device.
Figure 1B:
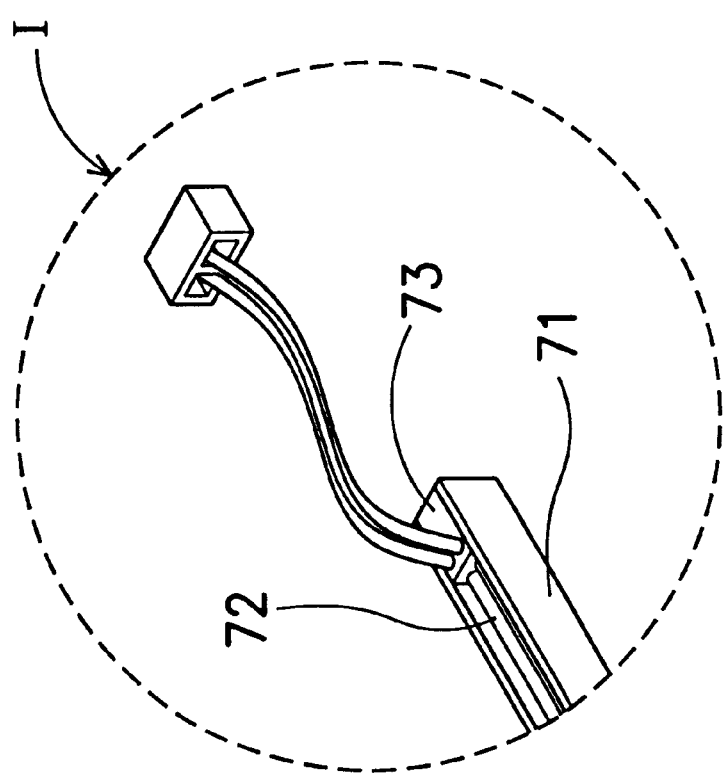
FIG. 1B is a local enlarged view of FIG.1A.
Figure 2:
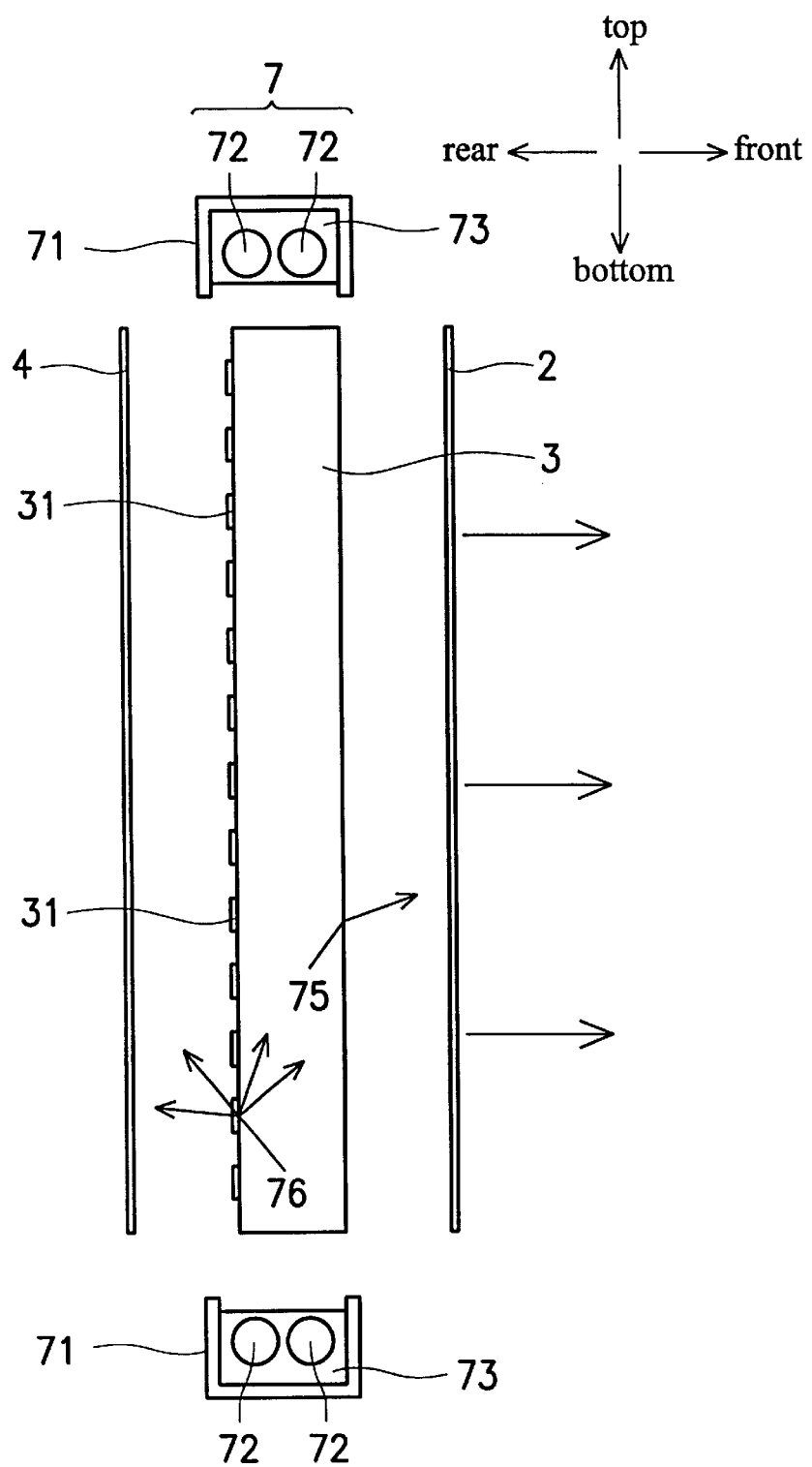
FIG. 2 depicts the operation of a conventional backlight device.
Figure 3:
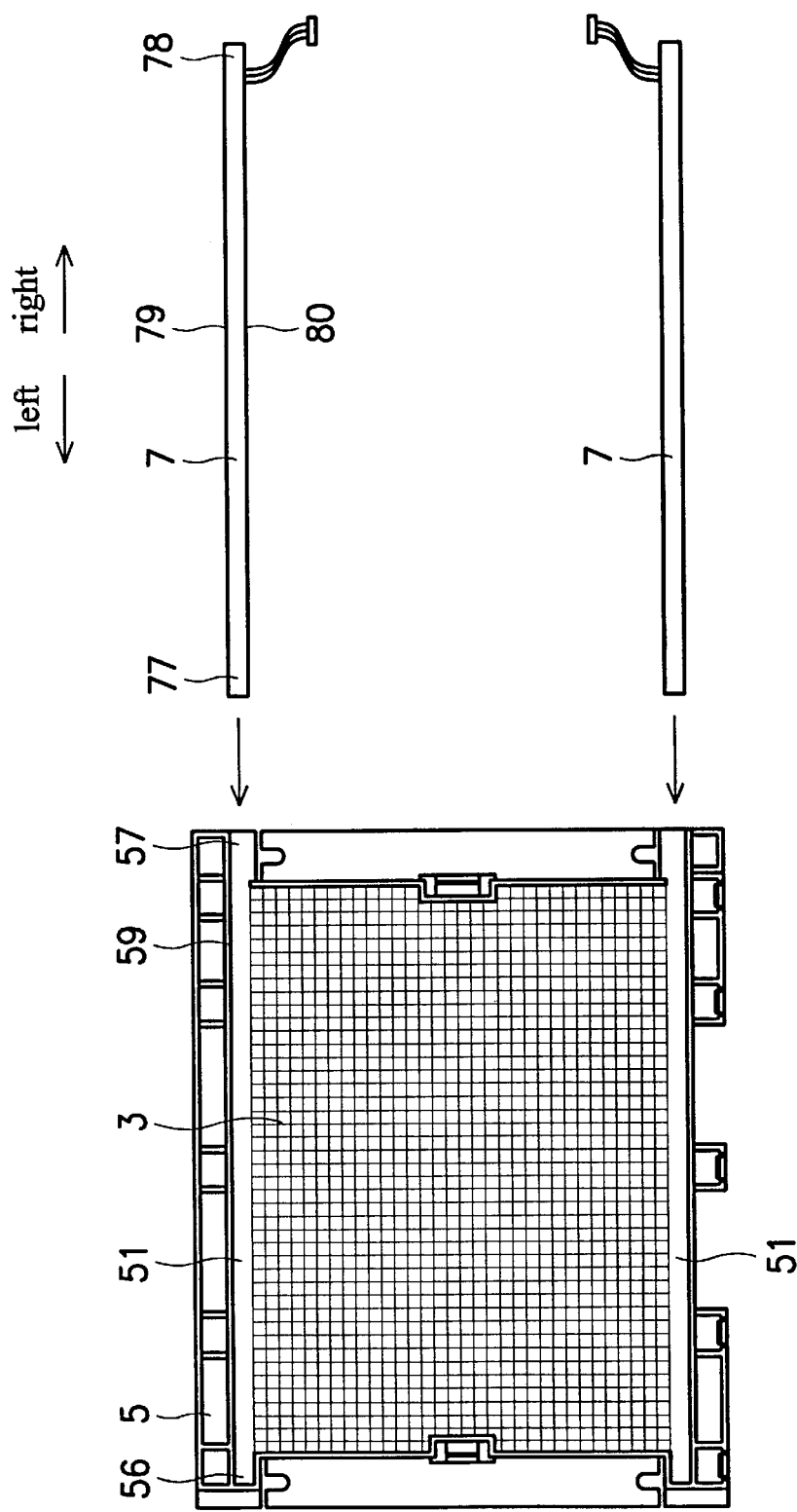
FIG. 3 is a front view of FIG. 1A.
Figure 4A:
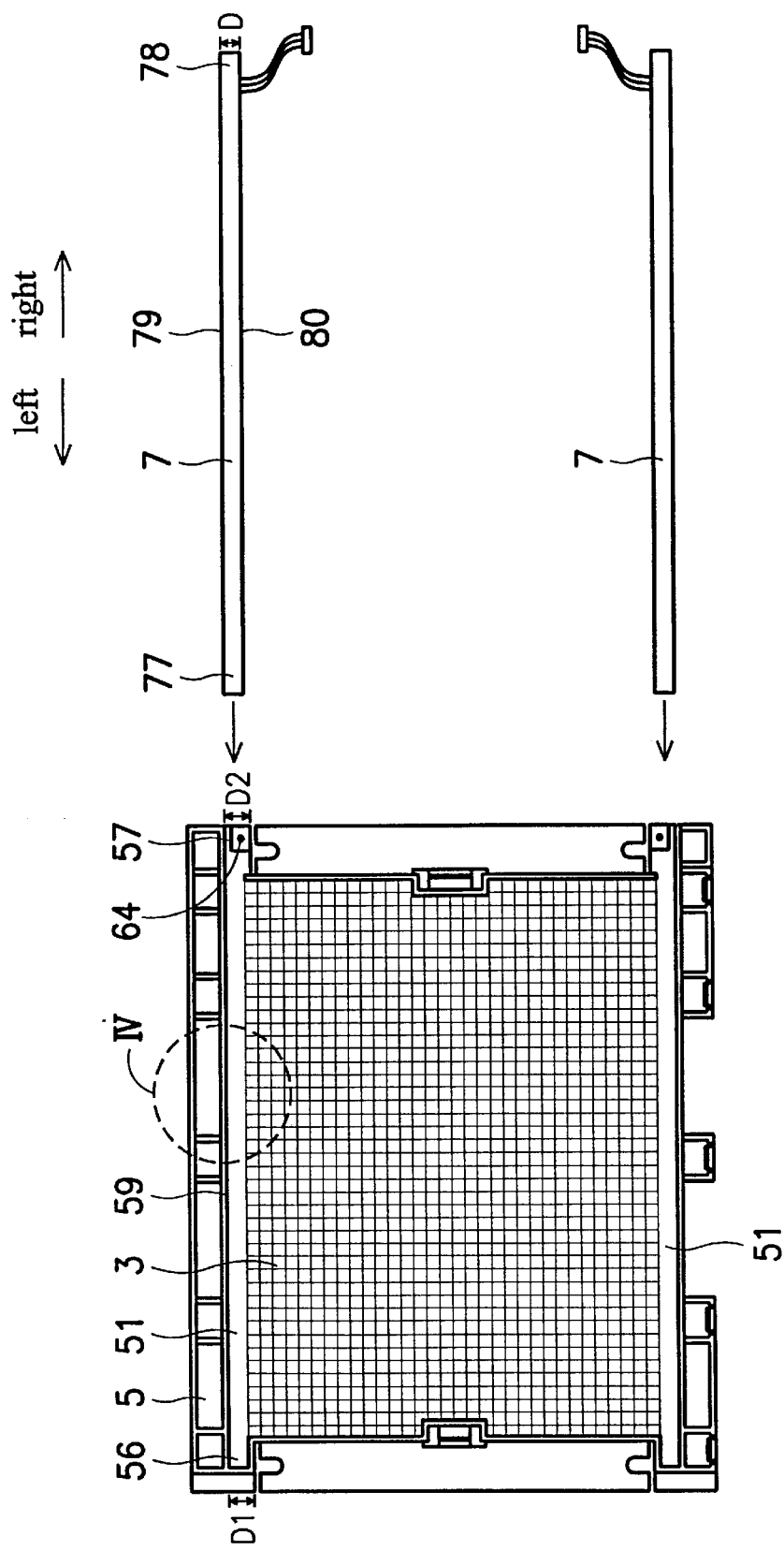
FIG. 4A is a front view of the backlight device in accordance with the present invention.

Referring to FIG. 4A, grooves 51 are formed and disposed between the lighting guide 3 and the inner surfaces of the second frame 5. Each groove 51 has a closed end 56 and an open end 57.

Figure 4B:
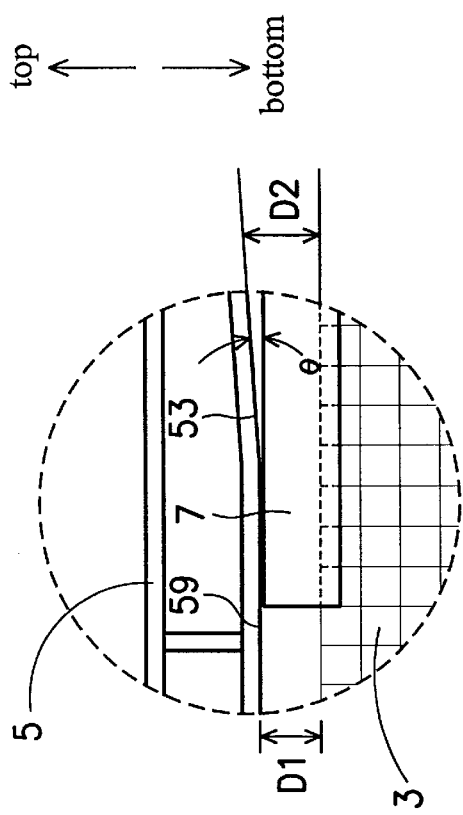
FIG. 4B is a local enlarged view of FIG. 4A.
Figure 4E:
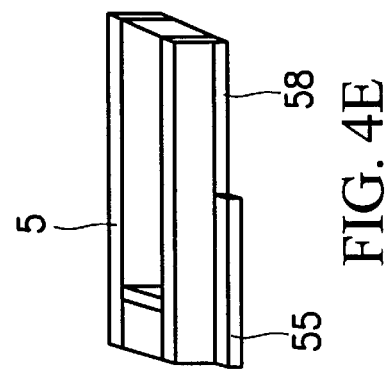
FIG. 4E depicts another example of the second frame.

FIG. 4B is a local enlarged view of FIG. 4A, wherein the second frame 5 has a first inner surface 59 parallel to the lamp assembly 7 and a second inner surface 53 inclined with respect to the lamp assembly 7. The lamp assembly 7 meets the inclined inner surface 53 of the second frame 5 at an angle θ, thereby producing a gap therebetween. This arrangement effectively decreases the friction between the lamp assembly 7 and the second frame 5 and facilitates the assembling/disassembling operations. FIG. 4C is a perspective diagram of the second frame 5 of FIG. 4B.

Figure 4D:
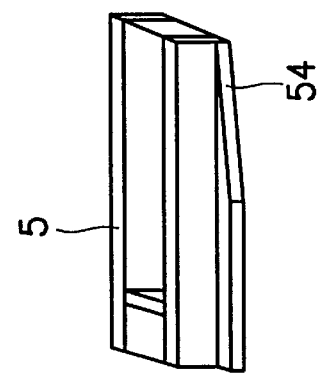
FIG. 4D depicts another example of the second frame.
Figure 4C:
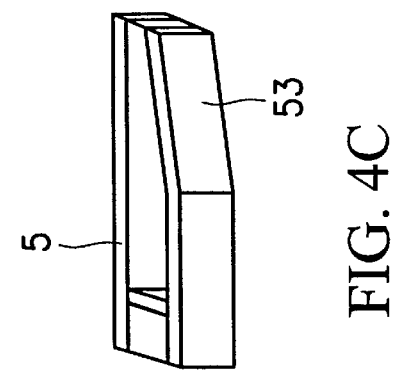
FIG. 4C is a perspective diagram of a second frame of FIG. 4B.

FIG. 4D depicts another example of the second frame 5, wherein reference numeral 54 indicates an inclined surface to create a gap between the lamp assembly and the second frame.

FIG. 4E depicts another example of the second frame 5, wherein the second frame 5 has a flange 55 on its inner surface 58. The flange 55 is parallel to the lamp assembly 7. The inner surface 58 is also parallel to the lamp assembly 7. The flange 55 creates a gap between the lamp assembly 7 and the inner surface 58 of the second frame 5, when the flange 55 physically contacts the lamp assembly 7.

Referring back to FIG. 4B, it is understood that the distance D1 between the first inner surface 59 and the lighting guide 3 is smaller than the distance D2 between the second inner surface 53 and the lighting guide 3.

Figure 5:
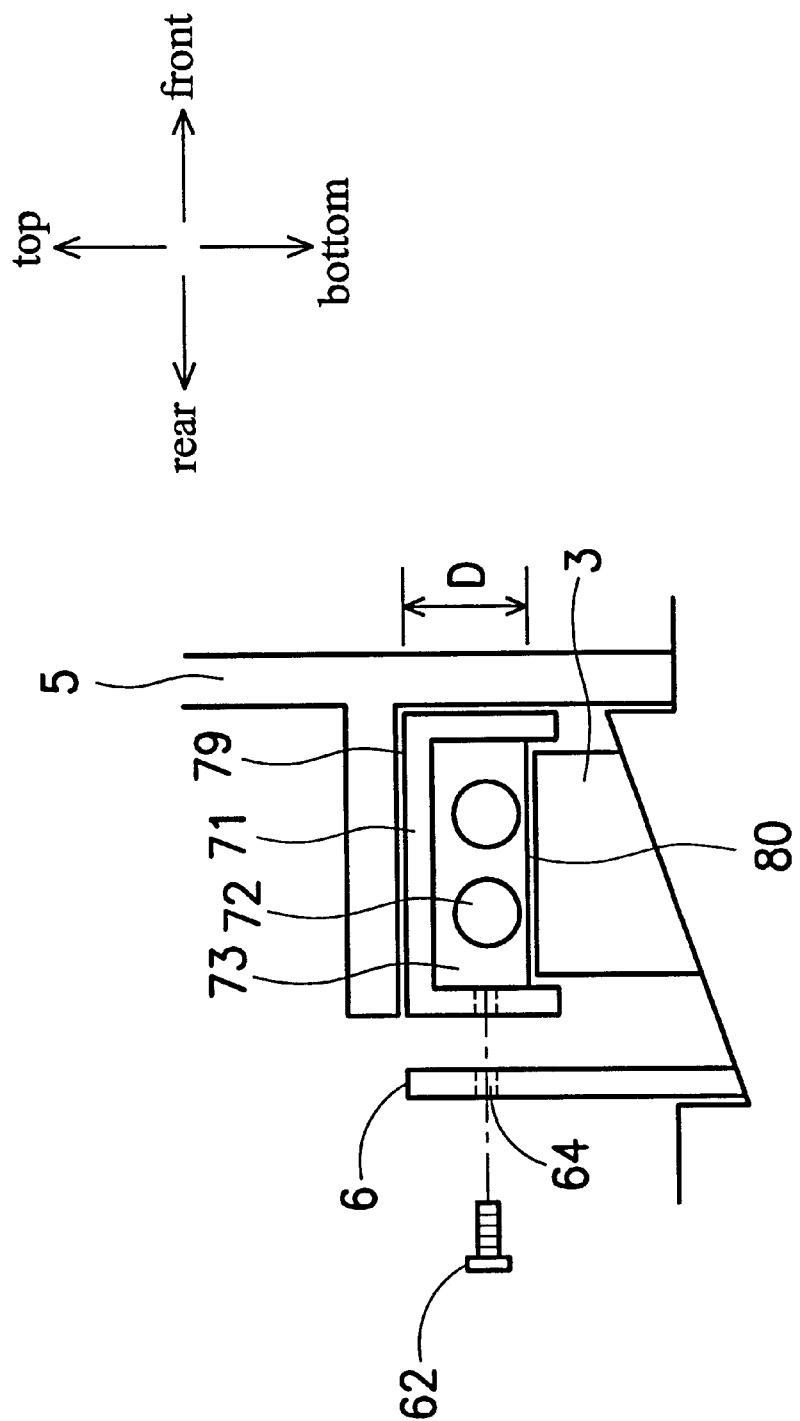
FIG. 5 depicts the lamp assembly and the back plate screwed together by a screw.

The lamp assembly 7 is elongated and has a first end 77, a second end 78, a first side surface 79 and a second side surface 80. Referring to FIG. 5, the first side surface 79 is the top surface of the tube guard 71. Also, the second side surface 80 is the bottom surface of the base 73. The width D of the lamp assembly 7 is substantially same as the distance D1 between the first inner surface 59 and the lighting guide 3. Therefore, the width D of the lamp assembly 7 is smaller than the distance D2 (>D1). When the lamp assembly 7 is inserted in the groove 51, the first side surface 79 physically contacts the first inner surface 59 of the second frame 5 and the second side surface 80 contacts the lighting guide 3. Also, the first side surface 79 does not contact the second inner surface 53 of the second frame 5 because a gap is provided between the second inner surface 53 and the lamp assembly 7. Therefore, the friction applied onto the second end 78 of the lamp assembly 7 is smaller than the friction applied onto the first end 77. That facilitates the insertion of the lamp assembly 7 into the groove 51.

However, the gap formed and disposed between the second inner surface 53 and the lamp assembly 7 makes the second end 78 of the lamp assembly 7 flexible in the groove 51. In other words, it fails to keep the second end 78 of the lamp assembly 7 at the designed position. Then, the quality of the light emitted from the backlight device is poor. That should be avoided. Therefore, a hole 64 is provided on the back plate 6, near the end 57 of the groove 51. A screw 62 goes through the hole 64 to fasten the second end 78 of the lamp assembly 7. Thus, the second end 78 of the lamp assembly 7 cannot move in the groove 51. Thus the lamp assembly 7 is substantially parallel to the lighting guide 3, and the quality of the liquid crystal display is good.

In conclusion, the present invention provides a gap between the lamp assembly 7 and the second frame 5 to decrease the friction therebetween. Then, it is easy for a operator to assemble/disassemble the lamp assembly 7.

Furthermore, the lamp assembly 7 is fixed to the back plate 6 at its end 78. This prevents the second end 78 of the lamp assembly 7 from moving in the groove 51. Then, the lamp assembly 7 is substantially parallel to the lighting guide 3, and the quality of the liquid crystal display is good.

While the. invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight device, including:
    a frame having a first inner surface and a second inner surface;
    a lighting guide disposed inside the frame;
    a lamp assembly disposed between the lighting guide and the frame, wherein:
    the first inner surface of the frame and the lighting guide are spaced apart a first distance D1, the second inner surface of the frame and the lighting guide are spaced apart a second distance D2, the lamp assembly is elongated and has a width D, the width D is substantially same as the first distance D1, and the width D is smaller than the second distance D2.

2. A backlight device as claimed in claim 1, wherein the lamp assembly further has a first side surface to physically contact the first inner surface of the frame and a second side surface to physically contact the lighting guide.

3. A backlight device as claimed in claim 1, wherein the first inner surface of the frame is flat, the second inner surface of the frame is also flat, and the lamp assembly is straight and is parallel to the first and second inner surfaces of the frame.

4. A backlight device as claimed in claim 1, wherein the first inner surface of the frame is flat, the second inner surface of the frame is flat and is inclined with respect to the first inner surface, and the lamp assembly is straight and is parallel to the first inner surface of the frame.

5. A backlight device, including:
    a frame;
    a lighting guide disposed inside the frame;
    at least one lamp assembly disposed between the frame and the lighting guide, the at least one lamp assembly being elongated and having a first end and a second end, wherein:
    the at least one lamp assembly physically contacts the frame at the first end, and a gap is formed between the frame and the second end of the at least one lamp assembly.

* * * * *